(12) United States Patent
Hahn et al.

(10) Patent No.: US 7,997,990 B2
(45) Date of Patent: Aug. 16, 2011

(54) DIRECT TORQUE FLOW CONSTANT VELOCITY JOINT HAVING COLLET CONNECTION

(75) Inventors: Steven C. Hahn, Shelby Township, MI (US); Hans Wormsbaecher, Lake Orion, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 464 days.

(21) Appl. No.: 12/159,341

(22) PCT Filed: Jan. 3, 2006

(86) PCT No.: PCT/US2006/000025
§ 371 (c)(1),
(2), (4) Date: Jun. 26, 2008

(87) PCT Pub. No.: WO2007/078295
PCT Pub. Date: Jul. 12, 2007

(65) Prior Publication Data
US 2008/0293500 A1 Nov. 27, 2008

(51) Int. Cl.
*F16D 3/223* (2011.01)
(52) U.S. Cl. ......... 464/182; 464/906; 403/342; 403/371
(58) Field of Classification Search .......... 464/111, 464/139–146, 178, 182, 904–906; 403/342, 403/359.1–359.6, 371; 384/538; 279/42, 279/43.2, 100
See application file for complete search history.

(56) References Cited

U.S. PATENT DOCUMENTS

| | | | |
|---|---|---|---|
| 1,179,288 A * | 4/1916 | Curry | 279/42 |
| 1,894,414 A | 1/1933 | Olson | |
| 2,168,469 A | 8/1939 | Brouwer | |
| 3,080,731 A * | 3/1963 | Atkinson | 464/178 X |
| 3,687,488 A * | 8/1972 | Tabor | |
| 4,185,475 A | 1/1980 | Kleinschmidt et al. | |
| 5,147,144 A | 9/1992 | Kasai | |
| 5,549,514 A | 8/1996 | Welschof | |
| 5,876,127 A | 3/1999 | Casey | |
| 7,553,238 B2 * | 6/2009 | Wormsbaecher et al. | 464/906 |

FOREIGN PATENT DOCUMENTS
EP  1111258 A1  6/2001

* cited by examiner

*Primary Examiner* — Gregory Binda
(74) *Attorney, Agent, or Firm* — Jennifer M. Brumbaugh; Mick A. Nylander; Rader, Fishman & Grauer PLLC

(57) ABSTRACT

A direct torque flow constant velocity joint collet connector includes an outer joint part having outer ball tracks, an inner joint part having inner ball tracks, a cage and a plurality of balls. The inner joint part is articulately secured in a rotationally fast way to the outer joint part with the plurality of balls held in the cage. The inner joint part includes a front portion, an inner bore, a collet extension and at least one slot. The collet extension extends from the inner ball tracks to the front portion of the inner joint part. The slot extends into the collet extension from the front portion between an outer surface and the inner bore of the inner joint part, wherein the collet extension of the inner joint part is compressible for selective attachment to a journal shaft of a supplied drive unit.

13 Claims, 2 Drawing Sheets

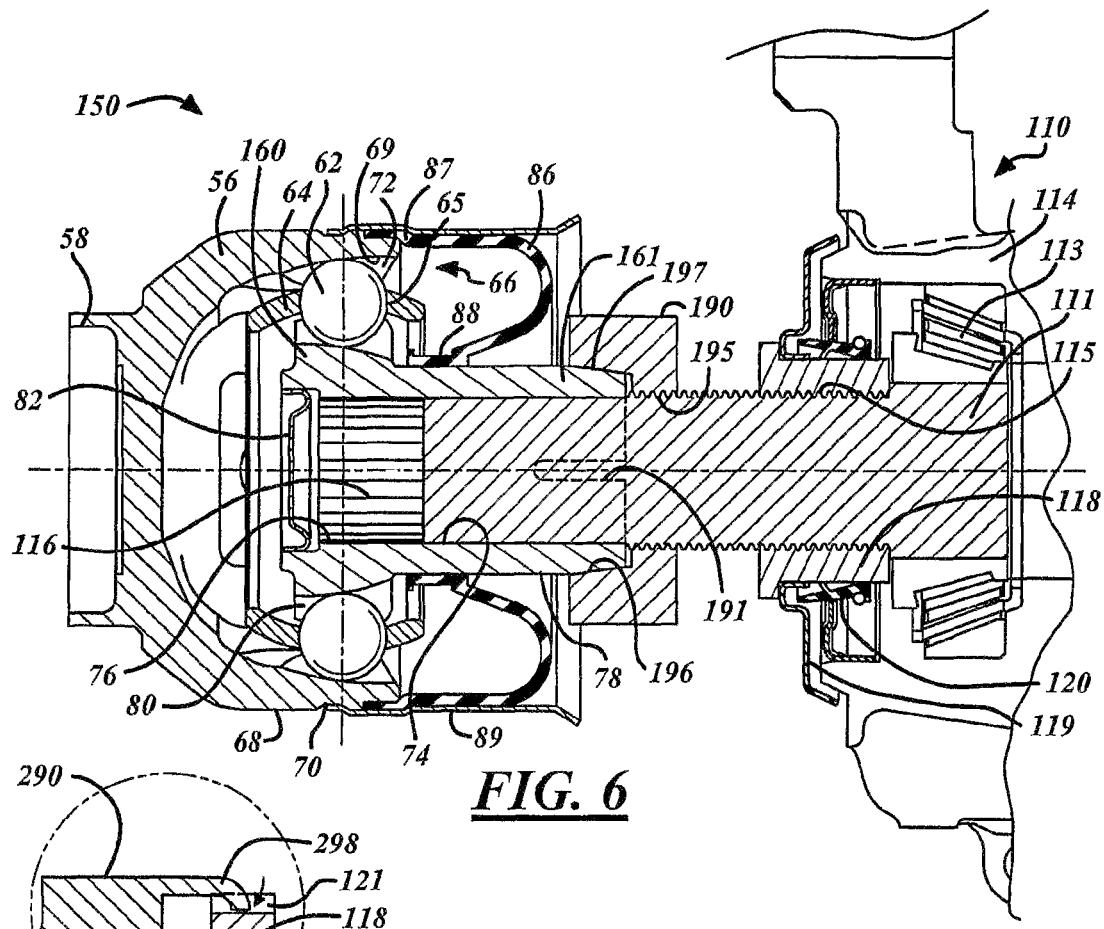
FIG. 6
FIG. 7A
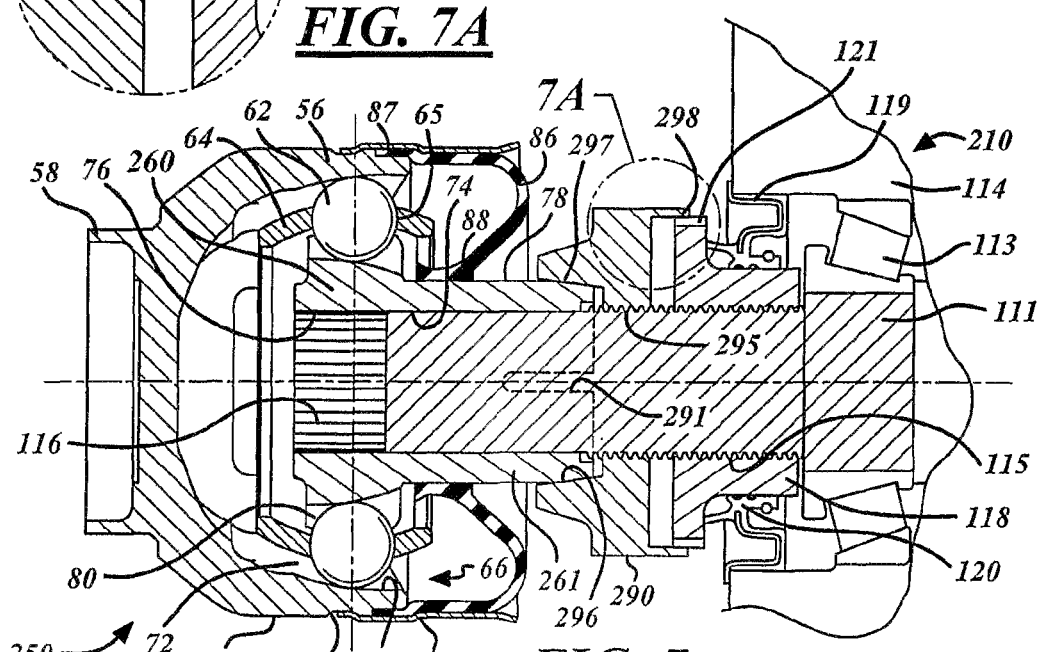
FIG. 7

DIRECT TORQUE FLOW CONSTANT VELOCITY JOINT HAVING COLLET CONNECTION

TECHNICAL FIELD

The present invention relates generally to motor vehicle shaft joints, and more particularly concerns a direct torque flow constant velocity joint having a colleted connection.

BACKGROUND ART

Constant velocity joints connecting shafts to drive units are common components in automotive vehicles. The drive unit typically has an output shaft or an input shaft for receiving the joint. Typically, the drive unit is an axle, transfer case, transmission, power take-off unit or other torque device, all of which are common components in automotive vehicles. Typically, one or more joints are assembled to the shaft to form a propeller or drive shaft assembly. It is the propeller shaft assembly, which is connected, for instance, at one end to an output shaft of a transmission and, at the other end, to an input shaft of a differential. The shaft is solid or tubular with ends adapted to attach the shaft to an inner race of the joint thereby allowing an outer race connection to a drive unit. The inner race of the joint is typically press-fit, splined, or pinned to the shaft making the outer race of the joint available to be bolted or press-fit to a hub connector, flange or stubshaft of the particular drive unit. At the other end of the propeller shaft, the same typical or traditional connection is made to a second drive unit when connecting the shaft between the two drive units. Connecting the shaft to a drive unit via the constant velocity joint in this manner is considered a traditional connection. Direct torque flow (DTF) connection is a newer connection style that has advantages and improvements over the traditional connection.

A DTF connection differs from a traditional connection in that an outer race is connected to the shaft that extends between different joints, and an inner race is connectable to a drive unit. One example of a DTF connection provides that the outer race of a constant velocity joint (CVJ) is friction welded to a propeller shaft and the inner race of the CVJ includes a female spline that is connectable to a journal shaft of a transmission. The inner race of the CVJ is rotationally secured by a splined connection directly to the journal shaft, thereby providing an indirect connection to the transmission. In order to retain the CVJ on the shaft, axial retention is required between the inner race and the shaft. For example, a circlip engaging a groove in the inner race and on the shaft may be utilized to retain the two parts. However, axial and radial clearances of the joint at the connection interface may be compromised for a given torque transfer capability. Moreover, this type of connection may be difficult to install, inspect or service.

It would be advantageous to have a DTF CVJ that overcomes the limitations indicated above. Moreover, it would be advantageous to have a DTF CVJ that provides for indirect connection to a drive unit while reducing radial and axial clearances for a given torque transfer capability. Furthermore, it would be advantageous to provide a DTF CVJ that improves installation, inspection or service at the connection interface.

DISCLOSURE OF THE INVENTION

Accordingly, the present invention provides a direct torque flow constant velocity joint (DTF CVJ) having a collet connection. The DTF CVJ collet connector has a neck or extension axially extending from an inner joint part providing a female or indirect connection type directly to a shaft of a drive unit, such as a transmission, transfer case or axle, while reducing radial and axial clearance. The DTF CVJ collet connector allows for additional flexibility by providing for improved installation, inspection or service at the connection interface.

A direct torque flow constant velocity joint collet connector is provided that includes a first shaft, an outer joint part, a plurality of balls, and an inner joint part. The outer joint part is connected to the first shaft. The outer joint part includes a bore and a plurality of ball tracks located in the bore. The inner joint part includes an outer surface, a corresponding plurality of ball tracks located on the outer surface, a front portion, an inner bore, a collet extension and at least one slot. The inner joint part is articulately secured in a rotationally fast way to the outer joint part with the plurality of balls. The collet extension extends from the plurality of ball tracks to the front portion of the inner joint part. The at least one slot extends into the collet extension from the front portion between the outer surface and the inner bore of the inner joint part. The collet extension of the inner joint part is compressible for selective attachment to a journal shaft of a supplied drive unit. Three embodiments of the invention are described below.

The present invention will be best understood by reference to the following detailed description and taken in conjunction with the accompanying drawings.

BRIEF DESCRIPTION OF DRAWINGS

For a more complete understanding of this invention, reference should now be made to the embodiments illustrated in greater detail in the accompanying drawings and described below by way of examples of the invention.

FIG. 6 shows a second embodiment of an inventive direct torque flow constant velocity joint collet connector.

FIG. 7 shows a third embodiment of an inventive direct torque flow constant velocity joint collet connector.

FIG. 7A shows a partial cross-section of a fourth compression nut according to the third embodiment of the invention in a locked position.

DETAILED DESCRIPTION

In the following description, various operating parameters and components are described for one or more constructed embodiments. These specific parameters and components are included as examples and are not meant to be limiting.

While the invention is described with respect to a direct torque flow constant velocity joint having a colleted connection for use in a vehicle, the following apparatus is capable of being adapted for various purposes including automotive vehicle drive axles, motor systems that use a propeller shaft, or other vehicles and non-vehicle applications which require propeller shaft assemblies for torque transmission.

Figure 1:
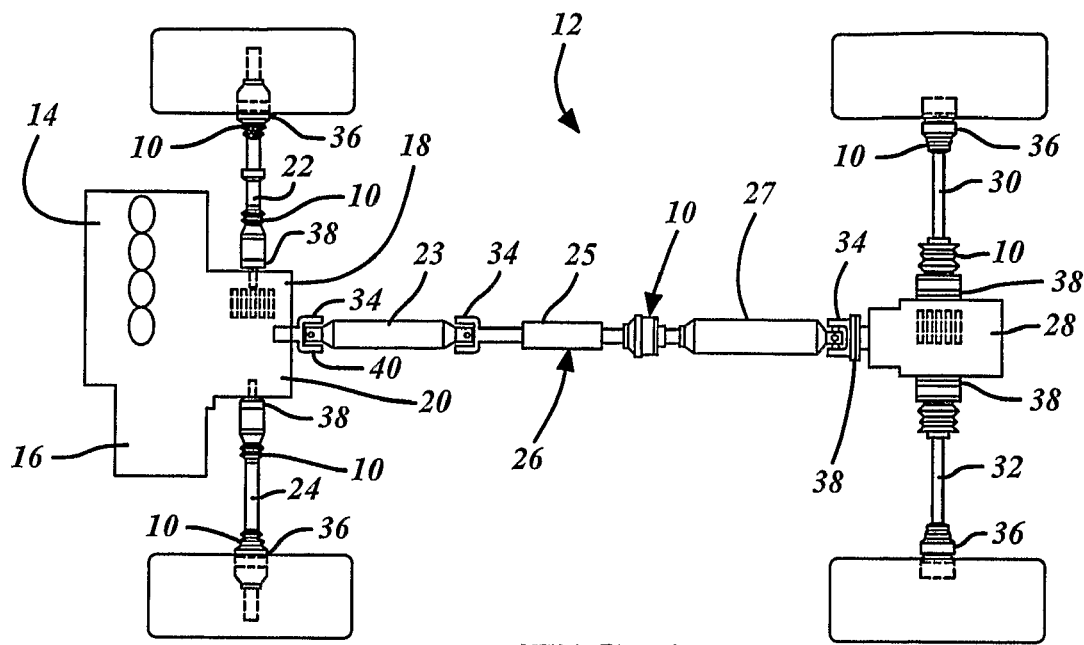
FIG. 1 shows a plan view of an exemplary drive system for a typical four-wheel drive automobile wherein the present invention may be used to advantage.

An exemplary drive system 12 for a typical four-wheel drive automobile is shown in FIG. 1. While a four-wheel drive system is shown and described, the concepts here presented could apply to a single drive unit system or multiple drive unit system, including rear wheel drive only vehicles, front wheel drive only vehicles, all wheel drive vehicles, and four-wheel drive vehicles. In this example, the drive system 12 includes an engine 14 that is connected to a transmission 16 and a power take-off unit 18. A front differential 20 has a right hand side half shaft 22 and left hand side half shaft 24, each of which are connected to a wheel and deliver power to the wheels. On both ends of the right hand side half shaft 22 and left hand side half shaft 24 are constant velocity joints 10. A propeller shaft 26 connects the front differential 20 to a rear differential 28 wherein the rear differential 28 includes a rear right hand side shaft 30 and a rear left hand side shaft 32, each of which include a wheel on one end thereof. Constant velocity joints 10 are located on both ends of the half shafts 30, 32 that connect to the wheels and the rear differential 28. The propeller shaft 26, shown in FIG. 1, is a three-piece propeller shaft that includes a plurality of Cardan joints 34 and one high-speed constant velocity joint 10. The propeller shaft 26 includes interconnecting shafts 23, 25, 27. The constant velocity joints 10 transmit power to the wheels through the propeller shaft 26 even if the wheels or the propeller shaft 26 have changed angles due to steering, raising or lowering of the suspension of the vehicle. The constant velocity joints 10 may be any of the standard types known, such as a plunging tripod, a cross groove joint, a fixed ball joint, a fixed tripod joint, or a double offset joint, all of which are commonly known terms in the art for different varieties of constant velocity joints 10. The constant velocity joints 10 allow for transmission of constant velocities at angles typically encountered in everyday driving of automotive vehicles in both the half shafts, interconnecting shafts and propeller shafts of these vehicles. Optionally, each Cardan joint 34 may be replaced with any other suitable type of joint, including constant velocity joint types. The direct torque flow constant velocity joint with a collet connector may be utilized to advantage for any of the above mentioned joint locations.

The shafts 22, 23, 24, 25, 27, 30, 32 may be solid or tubular with ends adapted to attach each shaft to an inner race or an outer race of a joint in accordance with a traditional connection, thereby allowing the outer race or inner race to be connected to a hub connector 36, a flange 38 or stubshaft 40 of each drive unit, as appropriate, for the particular application. Thus, any of the traditional connections identified in FIG. 1 at 10 or 34 may be direct torque flow connections in accordance with a first embodiment (FIG. 2), a second embodiment (FIG. 6) or a third embodiment (FIG. 7) of the present invention.

Figure 2:
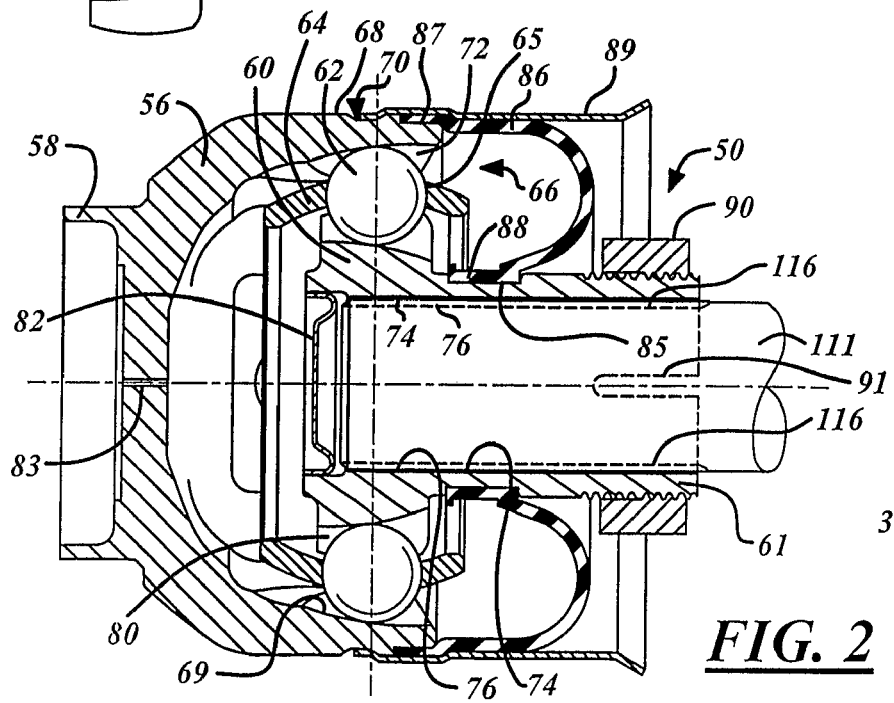
FIG. 2 shows a first embodiment of an inventive direct torque flow constant velocity joint collet connector.

For completeness of the description of the first, second and third embodiments of the present invention as given in FIGS. 2, 6 and 7, the term direct torque flow (DTF) connection refers to a connection from the inner race of a constant velocity joint (CVJ) to the shaft of a differential, transmission or transfer case, generally supplied by the customer. The connection typically is in the form of a spline because of its robust design features as understood by one skilled in the art. However, it is anticipated that other forms of connection are appropriate including fixed and releaseable connections between the inner race and the shaft. A mating key connection is just one example, without limitation, of a releaseable connector between the inner race and the shaft. Thus, a DTF connection refers to the inner race coupling to the shaft of a drive unit, such as a differential, transmission or transfer case without limitation, as opposed to the traditional connection mentioned above. The connection type may be divided into two styles of DTF connection types, i.e. direct or indirect, as described in United States Patent Publication No.: U.S. 2007/0123357 incorporated by reference herein. The DTF direct connection utilizes an extension shaft on the inner joint part to provide a male connection to a drive unit. The DTF indirect connection utilizes a female coupling on the inner joint part to provide a female connection to a shaft of a drive unit, such as shown in FIGS. 2, 6 and 7.

Also, as used herein, a DTF connector refers to a joint coupled to a shaft which forms a DTF shaft assembly. Only together with the shaft of a differential, for example, does a DTF connector combine to make a DTF connection. It is recognized that the shaft of the drive unit may include the shaft of any input or output drive unit and is not necessarily limited to a shaft of a differential, transmission or transfer case.

FIGS. 2, 6 and 7 will initially be described jointly below to the extent that their details correspond generally to one another. FIGS. 2, 6 and 7 each show a different DTF CVJ collet connector 50, 150, 250 assembled to a shaft journal 111 of a differential 110. The shaft journal 111 is supported by a bearing 113 in a housing 114, which, in this case, is illustrated in the form of a housing in the differential drive unit of a motor vehicle. The bearing 113 is axially tensioned by a tensioning nut 118, which has been threaded on to a threaded portion 115 of the shaft journal 111. The tensioning nut 118 is sealed relative to the axle housing 114 by a shaft seal 120. By way of a cover 119 secured to the tensioning nut 118, the shaft seal is protected against damage. The shaft journal 111 includes toothed or splined shaft portion 116 for receiving one of the DTF CVJ collet connectors 50,150, 250. Generally, each of the different DTF CVJ collet connectors 50, 150, 250 comprises an outer joint part 56 welded to the propeller shaft (not shown) by a collar 58 of the outer joint part 56, an inner joint part 60, 160, 260, torque transmitting balls 62 and a ball cage 64.

The outer joint part 56 generally has a circumferential-shaped or semi-spherical bore 66 therethrough. On an outer surface 68 of the outer joint part 56 is located at least one circumferential channel 70 around the entire outer periphery of the outer joint part 56. The outer joint part 56 is generally made of a steel material, however, it should be noted that any other type of metal material, hard ceramic, plastic, or composite material, etc. may also be used for the outer joint part 56. The material is required to be able to withstand the high speeds, temperatures and contact pressures of the DTF CVJ collet connectors 50, 150, 250. The outer joint part 56 also includes a plurality of axially opposed ball tracks 72 located on an inner surface 69 thereof. The tracks 72 generally form a spherical shaped path within the inner surface 69 of the outer joint part 56. The tracks 72 are axially opposed such that one half of the ball tracks 72 open to a side of the outer joint part 56 opposite to that of the other half of the ball tracks 72 in any number of patterns. Optionally, for different types of CVJs, the ball tracks all may open or axially align on the same side of the outer race. Also, the ball tracks 72 may be of a gothic arch or elliptical shape provided the pressure angle and conformity are maintained, or may be other shapes, as is understood by a person having skill in the art. Moreover, the ball tracks 72 on the inner surface 69 of the outer joint part 56 may also be double offset tracks. It should be noted that the embodiments shown in the drawings are a four plus four constant velocity joint, which has a total of eight balls in the DTF CVJ collet connectors 50, 150, 250. Further, it is recognized the DTF CVJ collet connector may be a fixed or plunging CVJ, including without limitation a VL, RF, AC, DO, or tripod joints including other fixed or plunging CVJs. However, it should be noted that it is contemplated to make a joint having any number of balls incorporating all of the features of the DTF CVJ collet connectors 50, 150, 250 according to the present invention.

Each of the inner joint parts 60, 160, 260 of the three embodiments generally has a circumferential shape. Each of the inner joint parts 60, 160, 260 are arranged within the bore 66 of the outer joint part 56. Each of the inner joint parts 60, 160, 260 includes a collet extension (to be described below) and an inner bore 74 that has a plurality of spline 76 for axially retaining the CVJ in a rotationally fast way to a toothed or splined shaft portion 116 of a shaft 111. Rotational retention of the inner joint parts 60, 160, 260 with a shaft 111 may be accomplished in other ways as would be recognized by a person of skill in the art. Axial retention of the inner joint part 60 with a shaft 111 will be described below for the present invention. The outer surface 78 of the inner joint part 60 includes a plurality of ball tracks 80 that are axially opposed. The ball tracks 80 generally have a spherical shape and are aligned with the ball tracks 72 on the outer joint part 56 such that the axial angle will open in a similar or the same direction as the ball track 72 directly aligned above it on the outer joint part 56. The ball tracks 80 on the outer spherical surface of the inner joint part 60 have one half of the ball tracks 80 axially oriented in one way while the other half of the ball tracks 80 are axially oriented in the opposite direction. The ball tracks 80 will open in an alternating pattern around the outer circumference of the inner race 60 in a matching relationship to that of the ball tracks 72 of the outer joint part 56. It should be noted that in one embodiment the inner joint part 60 is made of steel, however, any other metal composite, hard plastic, ceramic, etc. may also be used.

The ball cage 64 generally has a ring like appearance. The ball cage 64 is arranged within the bore 66 of the outer joint part 56 such that it is not, in these embodiments, in contact with the inner surface of the outer joint part 56. The cage 64 has a plurality of oblong-shaped orifices or windows 65 through a surface thereof. The number of windows 65 may match the number of ball tracks 72, 80 on the outer joint part 56 and inner joint part 60 of the different DTF CVJ collet connectors 50, 150, 250, which is eight windows 65 therethrough in the present embodiment of the invention. The number of balls and windows may, however, differ. The cage 64 along with the inner joint part 60 are preferably made of a steel material but any other hard metal material, plastic, composite or ceramic, etc. may also be used.

The constant velocity joint 50 includes a plurality of balls 62. The balls 62 are each arranged within one each of the windows 65 of the cage 64 and within a ball tracks 72, 80 of the outer joint part 56 and of the inner joint part 60, respectively. However, it is recognized that more than one ball may be arranged within each of the windows 65 or there may be no balls within a window 65. Therefore, the balls 62 will be capable of rolling in the axially opposed tracks 72, 80 aligned in the same direction.

The DTF CVJ collet connectors 50, 150, 250 may include a grease cap or barrier (not shown) on one end. The barrier is generally made of a metal material, however any plastic, rubber, ceramic or composite material may also be used. The barrier is press-fit or integrally constructed between the outer joint part 56 and the propeller shaft (not shown). However, any other securing method known may also be used such as fasteners, bonding, etc. The barrier will insure the grease, which is used as a lubricant, will remain within the DTF CVJ collet connectors 50, 150, 250. Also, between the shaft journal 111 and the inner joint part 60 there may be inserted a shaft cap 82, which seals the joint towards the housing 114 and, more particularly, contains grease within the joint. Optionally, a vent port 83 may be placed through the barrier or the outer joint part 56 to relieve any internal pressure, and the vent port 83 may include a valve (not shown).

The DTF CVJ collet connectors 50, 150, 250 include a boot 86 for providing a protective barrier for the internal parts. A first end 87 of the boot 86 is connected to an outer joint part 56 via a circumferential channel 70 on the outer surface 68 thereof. Any known securing method can be used to hold the boot 86 around the outer joint part 56 such as a boot clamp, fastener, etc. However, in this embodiment the first end 87 of the boot 86 is secured with a shroud clamp member 89 to the outer joint part 56. The boot 86 is generally partially semispherical extending between the first end 87 and a second end 88, such that the boot 86 may flex as each of the connectors 50, 150, 250 are rotationally articulated. The boot 86 is generally made of a urethane material but any other pliable material such as fabric, plastic, TPE, or rubber may also be used for the boot 86. The second end 88 of the boot 86 is connected to the inner joint parts 60, 160, 260 either via a circumferential channel or clamping portion 85 thereof. Also recognized, the second end 88 of the boot 86 may be connected to any portion of the outer surface 68 of the inner joint parts 60, 160, 260 by way of any clamping type known to a person of skill in the art. The shroud clamp member 89 also provides support to the boot 86 while, at the same time, providing additional protection from the environment. Each of the DTF CVJ collet connectors 50, 150, 250 will now be described for the first (FIG. 2), the second (FIG. 6) and the third (FIG. 7) embodiments of the invention.

Figure 3:
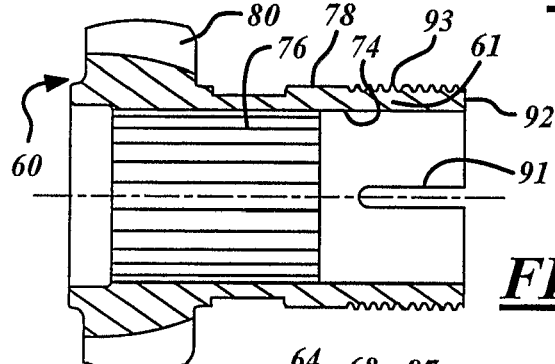
FIG. 3 shows an inner joint part having a collet extension according to the first embodiment of the invention.
Figure 4:
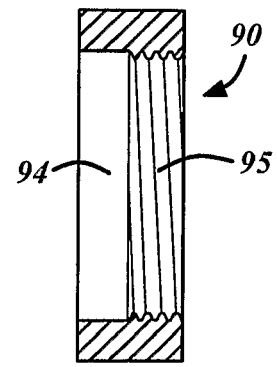
FIG. 4 shows a first compression nut according to the first embodiment of the invention.

FIG. 2 shows a first embodiment of an inventive direct torque flow constant velocity joint collet connector 50. Simultaneous reference may be made to FIG. 3, which shows an inner joint part 60 having a collet extension 61, and to FIG. 4, which shows a first compression nut 90, both figures in accordance with the first embodiment of the invention. The inner joint part 60 includes a collet extension 61 and one or more relief slots 91. The collet extension 61 axially extends the inner joint part 60 in the general direction of the to be connected drive unit, generally extending beyond the ball tracks 80. The collet extension 61 includes a collet threaded portion 93 on an outer surface 78 thereof, and a front portion 92 from whence the collet threaded portion 93 may begin. The one or more relief slots 91 extend into the collet extension from a front portion 92 between the outer surface 78 and an inner bore 74 of the inner joint part 60. The one or more relief slots 91 allow the inner bore 74 along the relief slot 91 to be decreased when compressive forces are applied to the outer surface 78 of the collet extension 61, thereby clamping and axially retaining the DTF CVJ collet connector 50 to a shaft journal 111 of a drive unit. It is recognized that any number of slot 91 may be utilized to advantage for the purpose of compressing the inner joint part 60 for axial retention upon a shaft journal 111. It is also recognized that the one or more slot 91 may extend into the collet extension 61 axially or may extend into the collet extension 61 at any generalized axial direction and, while not required, the slots 91 may be spaced evenly around the collet extension 61. Optionally, there may be two slots or four slots, in which case the slots may be placed at 180 degrees or 90 degrees apart from one another, respectively. Generally, it is recognized that the slot 91 enables the collet extension 61 to be collapsible when compression is applied thereto.

Compressive force may be applied to the collet extension 61 of the inner joint part 60 by a first compression nut 90. The compression nut 90 includes a recessed surface 94 for receiving an inner joint part 60 and a compression thread 95 for engaging a collet threaded portion 93 of the inner joint part 60. Accordingly, the compression nut 90 may compressively engage the inner joint part 60 thereby allowing axial retention of the DTF CVJ collet connector 50 to a shaft journal 111 of a drive unit when connected thereto. It is recognized that the compression thread 95 may include any thread design capable of compressing the inner joint part 60 for axial retention as would be recognized by a person of skill in the art, for example, without limitation, a castle nut. Moreover, the compression nut 90 may have an oval shape or the threads of the compression nut or inner joint part may be tapered which may provide the geometry for supplying compression force necessary for retention. Furthermore, while a recessed surface 94 is provided for improved engagement, it is not required.

Figure 5:
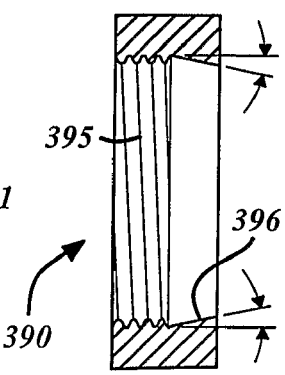
FIG. 5 shows a second compression nut that may be used to advantage according to the first embodiment of the invention.

FIG. 5 shows a second compression nut 390 that may be optionally used to advantage according to the first embodiment of the invention. Compressive force may be applied to the collet extension 61 of the inner joint part 60 by a second compression nut 390. The second compression nut 390 includes threads 395 for engaging a collet threaded portion 93 of an inner joint part 60 and a compression taper 396 for compressing the collet extension 61 of the inner joint part 60. While, the compression taper 396 is shown as conical, the compression taper 396 may have any shape capable of providing compressive force upon an inner joint part 60 as would be recognized by a person of skill in the art. Accordingly, the compression nut 390 may compressively engage the inner joint part 60 thereby allowing axial retention of the DTF CVJ collet connector 50 to a shaft journal 111 of a drive unit when connected thereto.

Optionally, the inner joint part 60 may include a collet taper (not shown) on an outer surface 78 of a collet extension 61 between a collet threaded portion 93 and a front portion 92, thereof. The collet taper (not shown) may be used to advantage for compressively retaining a DTF CVJ collet connector 50 to a shaft 111 when engaged with a compression taper 396 of a second compression nut 390.

FIG. 6 shows a second embodiment of an inventive direct torque flow constant velocity joint collet connector 150. The inner joint part 160 includes a collet extension 161 and one or more relief slots 191. The collet extension 161 axially extends the inner joint part 160 in the general direction of a differential 110 generally extending beyond the ball tracks 80. The collet extension 161 includes a collet taper 197 on an outer surface 78 and extends from a front portion 92 of the inner joint part 160. The one or more relief slots 191 extend into the collet extension from the front portion 92 between the outer surface 78 and an inner-bore 74 of the inner joint part 160. The one or more relief slots 191 allow the inner bore 74 along the relief slot 191 to be decreased when compressive forces are applied to the outer surface 78 of the collet extension 161 thereby clamping and axially retaining the DTF CVJ collet connector 150 to a shaft journal 111. It is recognized that any number of slots 191 may be utilized to advantage for the purpose of compressing the inner joint part 160 for axial retention upon a shaft journal 111. It is also recognized that the one or more slots 191 may extend into the collet extension 161 axially or may extend into the collet extension 161 at any generalized axial direction.

Compressive force may be applied to the collet extension 161 of the inner joint part 60 by a third compression nut 190. The compression nut 190 may include a compression taper 196 for compressively engaging an inner joint part 60 and a thread 195 for engaging a threaded portion 115 of a shaft journal 111. Accordingly, the compression nut 190 may compressively engage the inner joint part 60 thereby allowing axial retention of the DTF CVJ collet connector 150 to a shaft journal 111 of a differential 110 when connected thereto. It is also recognized that in order to obtain compression of the inner joint part 60, a compression taper 196 may engage a collet extension not having a collet taper. While, the compression taper 196 or the collet taper 197 is shown as conical, the compression taper 196 or the collet taper 197 may have any shape capable of providing compressive force upon an inner joint part 60 as would be recognized by a person of skill in the art.

FIG. 7 shows a third embodiment of an inventive direct torque flow constant velocity joint collet connector 250. Inner joint part 260 includes a collet extension 261 and one or more relief slots 291. The collet extension 261 axially extends the inner joint part 260 in the general direction of a differential 110 generally extending beyond a plurality of ball track 80. The collet extension 261 includes a collet taper 297 on an outer surface 78 and extends from a front portion 92 of the inner joint part 260. The one or more relief slots 291 extend into the collet extension from the front portion 92 between the outer surface 78 and an inner bore 74 of the inner joint part 260. The one or more relief slots 291 allow the inner bore 74 along the relief slot 291 to be decreased when compressive forces are applied to the outer surface 78 of the collet extension 261 thereby clamping and axially retaining the DTF CVJ collet connector 250 to a shaft journal 111. It is recognized that any number of slots 291 may be utilized to advantage for the purpose of compressing the inner joint part 260 for axial retention upon a shaft journal 111. It is also recognized that the one or more slots 291 may extend into the collet extension 161 axially or may extend into the collet extension 161 at any generalized axial direction.

Compressive force may be applied to the collet extension 261 of the inner joint part 260 by a fourth compression nut 290. The compression nut 290 may include a compression taper 296 for compressively engaging an inner joint part 260 and a thread 295 for engaging a threaded portion 115 of a shaft journal 111. Accordingly, the compression nut 290 may compressively engage the inner joint part 260 thereby allowing axial retention of the DTF CVJ collet connector 250 to a shaft journal 111 of a differential 110 when connected thereto. It is also recognized that in order to obtain compression of the inner joint part, a compression taper 296 may engage a collet extension not having a collet taper. While, the compression taper 296 or the collet taper 297 is shown as conical, the compression taper 296 or the collet taper 297 may have any shape capable of providing compressive force upon an inner joint part as would be recognized by a person of skill in the art.

Further the fourth compression nut 290 includes a lock key or tab 298 that may be crimped or staked into a groove 121 of a tensioning nut 118. As shown in FIG. 7, the tab 298 rotationally clears the groove 121 of the tensioning nut 118 during assembly of the DTF CVJ collet connector 250 to the differential 110. As shown in FIG. 7A, the tab 298 is staked into the groove 121, thereby rotationally locking the compression nut 290 relative to the shaft 111. The compression nut 290 may also be releasably locked relative to the shaft 111 as would be recognized by a person of skill in the art.

Generally, as described above, it is recognized that a first compression nut 90 and a second compression nut 390 connectively engage the threads of a collet extension 61 to impart compressive force thereon. Whereas, a third compression nut 190 and a fourth compression nut 290 connectively engage the threads of a shaft journal 111 to impart a compressive force upon the collet extensions 161, 261, respectively.

While the material, coupling and treatment of the various other DTF parts have not been discussed, appropriate selection would be well understood by a person of skill in the art.

From the foregoing, it can be seen that there has been brought to the art a new and improved direct torque flow constant velocity joint having a collet connector. While the invention has been described in connection with one or more embodiments, it should be understood that the invention is not limited to those embodiments. On the contrary, the invention covers all alternatives, modifications, and equivalents as may be included within the spirit and scope of the appended claims.

The invention claimed is:

1. A direct torque flow constant velocity joint collet connector comprising:
   an outer joint part having outer ball tracks;
   an inner joint part having an outer surface, and corresponding inner ball tracks located on said outer surface;
   a cage;
   a plurality of balls provided in the cage and engaging the inner and outer ball tracks; and
   a compression nut, the compression nut having a compression taper and a nut thread,
   wherein the inner joint part includes a front portion, an inner bore, a collet extension extending from said inner ball tracks to said front portion and at least one slot extending into said collet extension from said front portion between said outer surface and said inner bore, wherein said collet extension of said inner joint part is compressible for selective attachment to a shaft associated with a drive unit.

2. The direct torque flow constant velocity joint collet connector according to claim 1 wherein said one or more slots extend axially into said collet extension.

3. The direct torque flow constant velocity joint collet connector according to claim 1 wherein said one or more slots is two slots each spaced substantially opposite from each other on said collet extension.

4. The direct torque flow constant velocity joint collet connector according to claim 1 wherein said one or more slots is four slots spaced 90 degrees from each other on said collet extension.

5. The direct torque flow constant velocity joint collet connector according to claim 1 wherein said inner joint part includes a splined portion on said inner bore for selective attachment to said shaft.

6. The direct torque flow constant velocity joint collet connector according to claim 1 wherein said inner joint part includes a collet taper extending from said front portion along said collet extension on said outer surface of said inner joint part, said collet taper adapted to compressively engage the compression nut.

7. The direct torque flow constant velocity joint collet connector according to claim 6 further including a drive unit having the shaft and the compression nut, said shaft having a threaded portion, said compression taper of said compression nut compressively engaging said collet extension by the rotational engagement of said nut thread of said compression nut with said threaded portion of said shaft to selectively attach said collet extension to said second shaft.

8. The direct torque flow constant velocity joint collet connector according to claim 6 further including a drive unit having the shaft and the compression nut, said shaft having a threaded portion, said compression taper of said compression nut compressively engaging said collet taper of said collet extension by the rotational engagement of said nut thread of said compression nut with said threaded portion of said shaft to selectively attach said collet extension to said shaft.

9. The direct torque flow constant velocity joint collet connector according to claim 1 further including a drive unit having the shaft and the compression nut, said shaft having a threaded portion, said compression taper of said compression nut compressively engaging said collet extension by the rotational engagement of said nut thread of said compression nut with said threaded portion of said shaft to selectively attach said collet extension to said shaft.

10. The direct torque flow constant velocity joint collet connector according to claim 9 wherein said drive unit further comprises a tensioning nut having a groove, and said compression nut having a lock tab, wherein said lock tab is selectively pinable to said groove.

11. The direct torque flow constant velocity joint collet connector according to claim 1 further comprising a boot coupled between a circumferential channel of said outer joint part and said outer surface of said inner joint part.

12. The direct torque flow constant velocity joint collet connector according to claim 11 further comprising a shroud clamp member securing said boot to said outer joint part.

13. A direct torque flow constant velocity joint connection comprising:
   a drive unit having a journal shaft;
   a compression nut, the compression nut includes a compression taper and a nut thread, said journal shaft having a threaded portion, said compression taper of said compression nut compressively engaging a collet extension by rotational engagement of said nut thread of said compression nut with said threaded portion of said journal shaft; and
   a direct torque flow constant velocity joint collet connector compressively retained to said journal shaft of said drive unit by said compression nut;
   wherein said direct torque flow constant velocity joint collet connector comprises:
   an outer joint part having outer ball tracks;
   an inner joint part having an outer surface, and corresponding inner ball tracks located on said outer surface;
   a cage; and
   a plurality of balls provided in the cage and engaging the inner and outer ball tracks,
   wherein the inner joint part includes a front portion, an inner bore, the collet extension extending from said inner ball tracks to said front portion, at least one slot extending into said collet extension from said front portion between said outer surface and said inner bore and a collet taper extending from said front portion along said collet extension on said outer surface of said inner joint part, wherein said compression nut compressively engages said collet taper to selectively said collet extension to said journal shaft.

* * * * *